(12) United States Patent
Shahidi et al.

(10) Patent No.: US 8,013,036 B2
(45) Date of Patent: Sep. 6, 2011

(54) MODIFIED RUBBER PARTICLES AND COMPOSITIONS INCLUDING THE SAME

(75) Inventors: Nima Shahidi, Chicago, IL (US); Hamid Arastoopour, Downers Grove, IL (US); Fouad Teymour, Mount Prospect, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 12/711,882

(22) Filed: Feb. 24, 2010

(65) Prior Publication Data

US 2010/0152310 A1     Jun. 17, 2010

Related U.S. Application Data

(63) Continuation of application No. 11/241,074, filed on Sep. 30, 2005, now Pat. No. 7,816,446.

(60) Provisional application No. 60/615,467, filed on Oct. 1, 2004.

(51) Int. Cl.
*C08J 11/04* (2006.01)

(52) U.S. Cl. ......... 523/200; 523/202; 523/207; 523/211

(58) Field of Classification Search .................. 523/200, 523/202, 207, 211
See application file for complete search history.

(56) References Cited

U.S. PATENT DOCUMENTS

| | | | |
|---|---|---|---|
| 3,660,144 A | 5/1972 | Johnson et al. | |
| 4,257,925 A | 3/1981 | Freeguard | |
| 4,882,399 A | 11/1989 | Tesoro et al. | |
| 4,962,165 A | 10/1990 | Bodnick et al. | |
| 4,994,523 A | 2/1991 | Sasaki et al. | |
| 5,210,109 A | 5/1993 | Tateosian et al. | |
| 5,252,657 A | 10/1993 | Frankel et al. | |
| 5,266,402 A | 11/1993 | Delgado et al. | |
| 5,288,817 A | 2/1994 | Yamamoto et al. | |
| 5,425,904 A | 6/1995 | Smits | |
| 5,459,198 A | 10/1995 | Sharp | |
| 5,514,721 A | 5/1996 | Hart | |
| 5,580,929 A | 12/1996 | Tanaka et al. | |
| 5,607,981 A | 3/1997 | Oliveira da Cunha Lima | |
| 5,648,426 A | 7/1997 | Zolotnitsky | |
| 5,786,426 A | 7/1998 | Sperling et al. | |
| 5,904,885 A | 5/1999 | Arastoopour et al. | |
| 5,948,827 A | 9/1999 | Lupo et al. | |
| 5,973,060 A | 10/1999 | Ozaki et al. | |
| 6,015,861 A | 1/2000 | Mertzel et al. | |
| 6,084,009 A | 7/2000 | Mizoguchi et al. | |
| 6,224,796 B1 | 5/2001 | Grenier et al. | |
| 6,228,919 B1 | 5/2001 | Sommerfeld | |
| 6,239,215 B1 | 5/2001 | Morita et al. | |
| 6,251,965 B1 | 6/2001 | Wang et al. | |
| 6,387,965 B1 | 5/2002 | Benko et al. | |
| 6,403,683 B1 | 6/2002 | Kobayashi | |
| 6,624,272 B2 | 9/2003 | Futami et al. | |
| 6,639,012 B2 | 10/2003 | Wills et al. | |
| 2003/0232895 A1 | 12/2003 | Omidian et al. | |
| 2004/0132546 A1 | 7/2004 | Kuntimaddi et al. | |
| 2007/0004812 A1 | 1/2007 | Karthauser et al. | |

FOREIGN PATENT DOCUMENTS

| | | |
|---|---|---|
| EP | 0 252 510 A1 | 1/1988 |
| EP | 0 362 137 A2 | 4/1990 |
| EP | 0 875 534 A1 | 11/1998 |
| EP | 1 262 528 A2 | 12/2002 |
| JP | 03093029 A | 4/1991 |
| JP | 2001254048 A | 9/2001 |
| JP | 2003286369 A | 10/2003 |
| WO | WO 02/068168 A2 | 9/2002 |

OTHER PUBLICATIONS

Shahidi et al. ("Interpenetrating Polymer Networks Using Recycled Rubber Materials," AIChE Annual Meeting, San Francisco, CA [2003]).*
N. Shahidi, F. Teymour, H. Arastoopour "Interpenetrating Polymer Networks Using Recycled Rubber Materials," *AIChE Annual Meeting*, San Francisco, CA (Nov. 2003).
N. Shahidi, F. Teymour, H. Arastoopour "Amphiphilic Particulate Phase Semi-interpenetrating Polymer Networks Based on a Matrix of Recycled Rubber," *Polymer*, Jun. 2004; 45(15): 5183-90.
N. Shahidi, H. Arastoopour, F. Teymour "Amphiphilic Recycled Rubber Particles Used for Surface Coatings," *164th Rubber Division Meeting of ACS*, Cleveland, OH (Oct. 14-17 2003).
N. Shahidi, F. Teymour, H. Arastoopour, "Dispersing Behavior of Recycled Rubber Particles," *Macromolecular Symposia*, Feb. 2004; 206(1): 471-480.
N. Shahidi, F. Teymour, H. Arastoopour (for the $7_{th}$ International Workshop on Polymer Reaction Engineering, Hamburg, Germany) "Amphiphilic Particulate Phase Interpenetrating Polymeric Networks," DECHEMA Monographs vol. 137, (Oct. 2001) pp. 421-427.
Murayama, S., Kuroda, S., Osawa, Z., "Hydrophobic and hydrophilic interpenetrating polymer networks composed of polystyrene and poly(2-hydroxyethyl methacrylate) : 1. PS-PHEMA sequential IPNs synthesized in the presence of a common solvent," *Polymer*, 1993, vol. 34,No. 13, pp. 2845-2852.
DeGrazia, J.L., Bowman, C.N., "Settling characteristics of Microparticles Modified by Hydrophilic Semi-Interpenetrating Polymer Networks," *Journal of Applied Polymer Science*, vol. 55, 793-805 (1995).
N. Shahidi, F. Teymour, H. Arastoopour, "Preparation of Heterophase Interpenetrating Polymer Networks on a Recycled Matrix Produced by Solid State Shear Extrusion," Polymeric Materials: Science & Engineering 2001, 85, 540. (Abstract for the American Chemical Society National Meeting, Chicago, Illinois, Aug. 2001).

* cited by examiner

*Primary Examiner* — Kelechi C Egwim
(74) *Attorney, Agent, or Firm* — Pauley Petersen & Erickson

(57) ABSTRACT

Modified scrap rubber particles, a method for forming the modified rubber particles and compositions including the modified rubber particles. The rubber particles are impregnated with at least one polymerizable monomer and polymerized to impregnate the rubber particles with a polymer. The impregnated polymer provides the modified rubber particles with improved properties which increase the potential uses for recycled scrap rubber. The modified rubber particles are useful in surface coatings, such as latex paint or powder coatings and can be used as a soil substitute.

20 Claims, 7 Drawing Sheets

MODIFIED RUBBER PARTICLES AND COMPOSITIONS INCLUDING THE SAME

This application is a continuation of U.S. patent application Ser. No. 11/241,074, filed on 30 Sep. 2005 now U.S. Pat. No. 7,816,446, which claims the benefit of Provisional U.S. Patent Application Ser. No. 60/615,467, filed on 1 Oct. 2004. The co-pending parent patent application is hereby incorporated by reference herein in its entirety and is made a part hereof, including but not limited to those portions which specifically appear hereinafter.

BACKGROUND OF THE INVENTION

This invention is directed to modifying scrap tire rubber for use in or as other beneficial and desirable products.

Almost 3 million tons of scrap tires are annually generated in North America. Among the rubber recycling approaches, size reduction is a feasible approach for the most beneficial reuse of these materials. Currently, there are limited applications for the size reduced rubber particles, and development of new products is essential to expanding useful applications. One restricting factor on reusing rubber particles is the hydrophobic nature that limits the use to only non-aqueous media.

Polymers are generally classified as thermoplastics and thermosets. Thermoplastic polymers can generally be melted and recycled using heating and remolding processes. Thermoset polymers are crosslinked and, once they are set, the simple approach of melting and reforming into a new shape does not apply to them. Recycling of thermoset polymers is thus a challenging technical problem. Vulcanized rubber materials are thermoset polymers, and scrap tires represent the largest stream of waste rubber materials. Over 250 million tires (about one tire per person) are annually generated in North America and, for the most part, these are inefficiently used or disposed of in landfills.

More attention has been focused on reusing scrap tires in the past few years, but the current applications are generally limited to "low value" applications. Understanding the present markets for scrap tires is a key to continuation and expansion of the recycling efforts toward higher value added uses of these materials. Currently, there are typically three major markets for scrap tires: tire derived fuel (TDF); civil engineering applications; and crumb rubber applications. In addition, small percentages of scrap tires used are often exported or used in agricultural applications.

Incineration of scrap tires to generate energy is a well-known technology and is the largest market for scrap tires in North America. TDF as a source of energy is probably as efficient, and possibly less expensive, than fossil fuels. As late as 1990, the only recycling approach for scrap tires was the use of TDF. More environmentally friendly applications have been developed since then, such that now only about 50 percent of the total recycled scrap tires are in TDF applications.

TDF is a sufficient way for reducing the number of stockpiled scrap tires. However, a valuable source of raw materials is lost using this approach. Possible reuse of scrap tires in new products provides considerably more energy than simply burning.

Civil engineering is a fast growing and the second largest market for scrap tires. In the typical civil engineering application, shredded tire is used where there is an economic benefit as compared to the price of soil or other fill materials. The two major factors contributing to the dynamic growth of this market are the existence of a considerable amount of tire shreds from stockpile abatement projects and availability of significant guidelines and information for shredded tire in civil engineering applications. Civil engineering applications are not considered high value added uses of scrap tires, because in most applications the rubber particles are used as a replacement for generally inexpensive materials like soil.

Size reduction seems to be a promising recycling approach for beneficial uses of scrap tires in high performance products. Size reduction generally refers to grinding the vulcanized rubber into shredded particles in the typical size range of 25 mm to 150 mm. Further size reduction of the shredded materials into smaller particles (less than 2000 microns) is defined as pulverization. According to ASTM D 5603-96, the recycled rubber particles are classified as coarse and fine particles. Rubber particles in the size range of 2000 microns to 425 microns are coarse particles and the particles smaller than 425 microns are classified as fine particles.

Today, there are four major applications of crumb rubber usage: rubber modified asphalt (RMA), molded products, tire/automotive industry and sport surfacing. These applications could be considered as higher value added use of recycled rubber materials, compared to the civil engineering and TDF applications discussed above.

The crumb rubber applications have a limited market compared to the other applications. An important factor impacting this market is the imbalance in supply and demand of crumb rubber materials. To increase demand, there is a need for more focus on developing more products for new applications.

Direct addition of rubber particles into the matrix of another polymer that is incompatible with rubber particles generally results in poor mechanical properties of the produced materials. Poor interfacial adhesion between surfaces of the rubber particles with matrix is typically the main reason for these failures. Surface modification of the rubber particles, or addition of a compatiblizer, may enhance the mechanical properties of the resulting composite materials. The molded product of the binder and rubber particles might have limited application due to the particular shape of the mold used. A broader range of applications could be obtained without using a mold if the binder is also in the particulate form. The potential application of such composite materials is in polymeric surface coatings such as waterborne polymeric coatings or dry powder coatings. Waterborne polymeric emulsions are the most suitable choice of binders in particulate form. However, recycled rubber particles have a very poor dispersibility in aqueous media due to their hydrophobic nature. Addition of a hydrophilic character to hydrophobic rubber particles would allow their utilization in such media.

There is a need for a method of modifying reclaimed rubber particles from scrap tires to make them more useable in higher value applications and products. There is a need for a modified rubber particle that has hydrophilic properties.

SUMMARY OF THE INVENTION

A general object of the invention is to modify scrap rubber particles to allow for broader and more valuable uses.

A more specific objective of the invention is to overcome one or more of the problems described above.

The general object of the invention can be attained, at least in part, through a method of forming a composition including rubber particles. The method includes providing a quantity of the rubber particles, and impregnating the rubber particles with a first polymerizable monomer that comprises a hydrophobic monomer. The first polymerizable monomer is polymerized to form modified rubber particles.

The invention further comprehends a surface coating material comprising a quantity of rubber particles including an impregnated polymer.

The invention still further comprehends a modified rubber particle, such as a rubber particle impregnated with a polymer including a hydrophobic monomer.

This invention provides a novel approach for use of recycled rubber particles, such as in aqueous media applications. Water dispersible rubber particles are provided by preparation of amphiphilic particulate phase interpenetrating polymer networks (PPIPNs) on a matrix of recycled rubber particles using, for example, poly(acrylic acid) (PAA). Solid-state shear extrusion (SSSE) pulverization processes can be used to obtain a fine rubber powder. The particles produced by these processes have a very high surface area compared to those produced by other processes, generally due to the resulting irregular shape. In addition, the produced particles are believed to be partially devulcanized due to the high shear and compression forces applied during the pulverization process. Lower crosslinking densities of the rubber particles make them more suitable for chemical modification and additional processing.

One potential application of modified rubber particles provided by this invention is as an additive for surface coatings, such as waterborne polymeric coatings or paints. High solid, but low-volatile organic compounds (VOC) polymeric coatings can be prepared by addition of the modified rubber particles of this invention into a commercially available self-curing waterborne emulsion. The impregnated polymers, e.g., the acid groups in PAA, improve the adhesion of the coatings to steel substrate while the elastic behavior of the rubber particles provides higher impact strength.

These and other objects and features of this invention will be better understood from the following detailed description taken in conjunction with the drawings.

DESCRIPTION OF PREFERRED EMBODIMENTS

Figure 1:
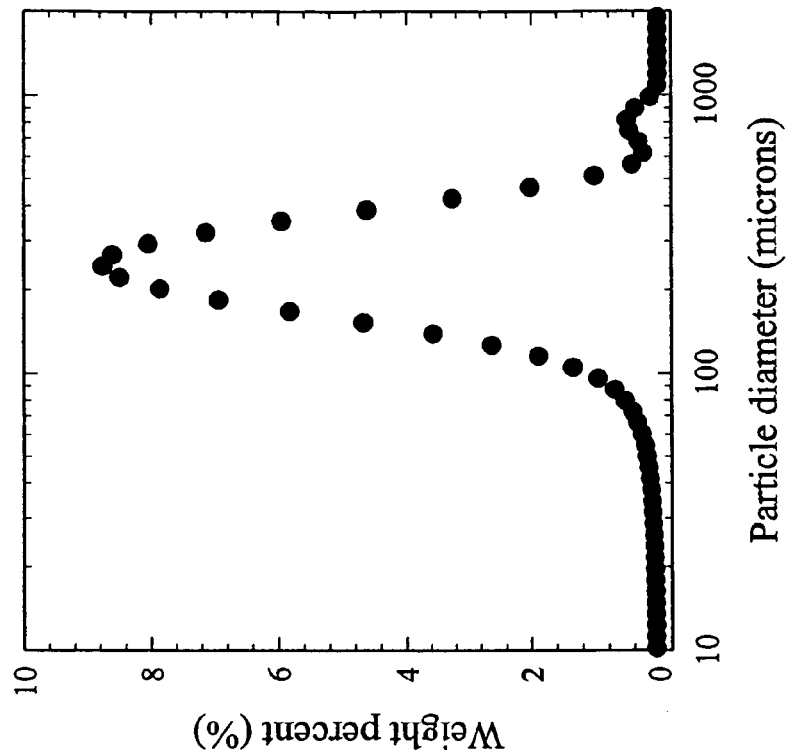
FIG. 1 is a plot summarizing the size distribution of exemplary swollen rubber particles dispersed in toluene (open circles) using laser diffraction technique and the corrected size distribution for unswollen particles (solid circles).

This invention provides a method of modifying the chemical structure of rubber particles, such as rubber particles obtained from post-consumer rubber items and tire rubber. The modified rubber particles of this invention have uses in various applications, some of which are discussed further below.

The method according to this invention begins with rubber particles. The rubber particles can include one or more of various types of rubber particles, but the method of this invention has particular usefulness using scrap tire rubber. The tire tread portion of the scrap tires generally provides the most desirable rubber for use in this invention, due to the higher purity of the rubber in the tread portion. The method of this invention provides a useable product from post-consumer tire rubber waste. The tire rubber is desirably reduced to small particles using means available to those skilled in the art. The rubber particles used in a method according to one embodiment of this invention desirably have an average particle diameter of about 75 microns to about 1000 microns.

In one embodiment of this invention, the tire rubber is pulverized, such as according to a solid-state shear extrusion (SSSE) pulverization process, to obtain a fine rubber powder. In an SSSE process according to one embodiment of this invention, rubber granulates are subjected to compression shear strain in a single screw extruder. The screw design provides a decreasing channel depth to exert compression, while the relative movement of the screw with respect to the barrel wall ensures the shearing of the granulates. Cooling elements remove the heat dissipated during pulverization to reduce or eliminate agglomeration of the fine particles and the viscoelastic relaxation of the stresses at elevated temperatures. Suitable SSSE pulverization processes are disclosed in U.S. Pat. No. 5,904,885, issued on 18 May 1999, to Arastoopour et al. The particles produced by SSSE processes generally have a very high surface area compared to those produced by other processes, due to their irregular shape. In addition, the produced particles are partially devulcanized due to high shear and compression forces applied during the pulverization process. Lower crosslinking densities of the rubber particles make them more suitable for chemical modification and additional processing.

In the method of one embodiment of this invention, the rubber particles are impregnated with a reaction mixture including at least one type of polymerizable monomer, and desirably a polymerization initiator. In a subsequent step, the impregnated rubber particles are placed in a chemical reactor and undergo a polymerization reaction of the absorbed monomer(s) inside the rubber network. The resulting modified rubber particles are impregnated with a polymer formed of the polymerized monomer(s).

Modification of the rubber particles according to the process of this invention provides the rubber particles with particulate phase interpenetrating polymer networks (PPIPNs). The resulting polymers extend through the porous matrix of the rubber particles and provide the rubber particles with different and useful properties. Hydrophobic PPIPNs are produced by the method of this invention when a hydrophobic polymer is formed by the reaction formulation. Modification of rubber particles through the formation of hydrophobic PPIPNs desirably enhances the internal structure of the rubber particles. One advantage of this approach is to add a thermoplastic behavior to the elastic rubber particles to make them suitable for further processing by melting and molding. Another benefit is the introduction of reactive functional groups to the rubber particles to enable their use as reactive agents in applications such as powder coatings. Amphiphilic PPIPNs are produced when a hydrophilic polymer is formed by the reaction formulation. Modification of rubber particles through the formation of amphiphilic PPIPNs results in addition of a hydrophilic character to the internal and external structure of hydrophobic rubber particles. The resulting modified rubber particles are water dispersible and suitable for use in a variety of aqueous media applications, such as additives to waterborne paints.

In one embodiment of this invention, the rubber particles are impregnated with a polymerizable monomer, a swelling agent and an initiator. The swelling agent swells the rubber particles, i.e., increases the size of each rubber particle and its porous matrix, to enhance the permeation of the impregnated polymerizable monomer within the rubber particles. The swelling agent can include any of various chemicals known to swell rubber particles, such as toluene, and can even be a polymerizable monomer, such as styrene. In one embodiment the rubber particles are impregnated with a monomer mixture where a first polymerizable monomer, e.g., a hydrophobic monomer such as styrene, acts as a swelling agent and a second polymerizable monomer, e.g., acrylic acid monomer, is provided for improving the physical and/or chemical properties of the rubber particles after a polymerization reaction.

An ionic amphiphilic PPIPN is formed in rubber particles according to one embodiment of this invention using acrylic acid polymerization. The rubber particles are soaked in and impregnated with a de-aerated mixture of acrylic acid, toluene (as a swelling agent) and an initiator, such as 2,2'-azobisisobutyronitrile (AIBN). The toluene promotes swelling of the rubber, thereby increasing the interstitial molecular space in the rubber matrix and allowing the acrylic acid monomer to impregnate the rubber particles. The swollen/impregnated particles are desirably centrifuged to remove excess monomer solution and placed as an aqueous suspension in a polymerization reactor to create modified rubber particles. The ionic strength of the aqueous phase can be manipulated by addition of an electrolyte, such as sodium chloride electrolyte (0.1 M, 1 M), to prevent monomer desorption from the rubber particles. Adjusting the pH of the system, e.g., decreasing the pH by addition of hydrochloric acid or similar acid, is an alternative means for reducing or eliminating monomer desorption from the rubber particles.

A non-ionic amphiphilic PPIPN is formed in rubber particles according to another embodiment of this invention using vinyl acetate monomer. As the vinyl acetate monomer is only slightly water-soluble, it is generally not necessary to manipulate the ionic strength of the aqueous phase, as discussed above. However, toluene is still useful as a swelling agent despite the vinyl acetate's closer solubility parameter to the rubber, as the moderate polar nature of the vinyl acetate reduces its ability to swell the rubber. After impregnating the rubber particles with the vinyl acetate monomer, the vinyl acetate is polymerized to polyvinyl acetate (PVAc). A hydrolysis step using a methanol/sodium hydroxide solution can be used to convert the polyvinyl acetate to hydrophilic polyvinyl alcohol (PVA).

In another embodiment of this invention, a quantity of rubber particles is impregnated with a first polymerizable monomer that is a hydrophobic monomer. The hydrophobic monomer can be polymerized to form a homopolymer or used in combination with a second polymerizable monomer to form a copolymer, as discussed further below.

In one embodiment of this invention, the rubber particles are impregnated with a monomer mixture including a first polymerizable monomer and a second polymerizable monomer that differs from the first polymerizable monomer. When polymerized, the first and second polymerizable monomers form, and impregnate the modified rubber particles with, a copolymer.

Various monomers and combinations of monomers are available for impregnating the rubber particles according to this invention. The resulting impregnated polymer, either a homopolymer or copolymer, can be hydrophilic or hydrophobic, thereby providing the modified rubber particles with various and different chemical and/or physical characteristics. Examples of monomers suitable for use as the first and/or second polymerizable monomer include, without limitation, styrene, methyl methacrylate, butyl acrylate, glycidil methacrylate, hydroxy ethyl methacrylate, acrylic acid, methacrylic acid, vinyl acetate, and combinations thereof. As will be appreciated, some hydrophobic monomers can be used to form hydrophilic polymers. For example, vinyl acetate is hydrophobic, but after preparation of poly(vinyl acetate) a hydrolysis step can convert it (fully or partially) to hydrophilic poly(vinyl alcohol).

Examples of monomers used for forming a hydrophobic PPIPN on and/or within the rubber particles include styrene, methyl methacrylate, butyl acrylate and similar monomers. These monomers desirably alter the mechanical properties of the rubber particles, for example, to allow further processing in a thermal press. Some monomers, such as styrene and methyl methacrylate, add strength and toughness, while butyl acrylate is generally known as a soft monomer and can be used to impart flexibility, especially as a comonomer with other monomers. Other monomers desirably provide chemical functionalities on the rubber particles that are capable of reaction upon further processing, especially for crosslinking reactions during curing or casting of films. Examples of such monomers include glycidil methacrylate (GMA), which adds epoxide functionality, and hydroxy ethyl methacrylate, which adds hydroxy functionality.

A hydrophobic monomer can desirably be used in combination with a second polymerizable monomer, such as from the above listing, to impregnate rubber particles with a copolymer. Incorporating a hydrophobic monomer in a monomer mixture including a second monomer, particularly a hydrophilic monomer, has particular benefit in functioning as a swelling agent, thereby reducing or eliminating the need for toluene as a swelling agent. A hydrophobic monomer can be a more desirable swelling agent because it can be polymerized, and there is no need to remove it from the modified rubber particles at the end of polymerization process. Hydrophobic monomers, such as styrene, can also facilitate the polymerization reaction of acrylic acid inside of the rubber particles, and in one embodiment of this invention, the modified rubber particle include rubber particles impregnated with a copolymer of acrylic acid and a hydrophobic monomer, such as styrene.

As discussed above, a polymerization initiator is generally included with the impregnating monomer solution and used to polymerize the impregnated monomers. As will be appreciated by those skilled in the art following the teachings herein provided, various and alternative polymerization initiators are available for use in the method of this invention. An example of a suitable polymerization initiator is azobisisobutyronitrile. In one embodiment of this invention, the polymerization reaction occurs with the polymerizable monomer impregnated rubber particles disposed within an aqueous suspension.

Optionally, a bifunctional crosslinking monomer, or a crosslinking agent, is used in the polymerization to induce crosslinking of the impregnating polymer phase. In such case, the interpenetrating polymer network (IPN) is known as a full-IPN, as opposed to the "semi-IPNs" discussed above. Examples of crosslinking monomers are divinyl benzene, ethylene glycol diacrylate (EGDA), and ethylene glycol dimethcrylate (EGDMA).

Modification of rubber particles through the method of this invention results in production of advanced rubber materials. The modified rubber particles of this invention render the rubber particles useful in numerous applications for which the original, unmodified rubber particles would not be useable. Some exemplary applications are discussed herein below for illustration, but this list is by no means exhaustive.

As discussed above, modification of rubber particles with hydrophilic polymers provides a hydrophilic character to the internal and external structure of hydrophobic rubber particles. The resulting amphiphilic PPIPNs are water dispersible and render the modified rubber particles suitable for use in a variety of aqueous media applications, such as the exemplary embodiments discussed below.

One exemplary application of the modified rubber particles of this invention having an interpenetrating hydrophilic polymer is in the production of water-borne surface coatings. The water dispersibility of the amphiphilic PPIPNs enables the use of the modified rubber particles as additives to, for example, waterborne paints. The amphiphilic character results in strong adhesion of the waterborne paints to the modified rubber particles. The result is the masking of the black color of the rubber particles with any of a variety of color polymeric coatings.

The modified rubber particles can be utilized as a texturing additive and/or an impact modifier in water-borne latex formulations. As the particles are water dispersible, the latex particles will generally surround the modified rubber particles. When the coating is subsequently dried, and as film formation occurs in the latex phase, the continuous film will not only form on the surface of the substrate to which the coating is applied, but also on the surface of each modified rubber particle. Concurrently, hydrogen bonding between polar groups of the impregnated polymer and those on the surfactant molecule that is stabilizing the latex, will help stabilize the composite coating and ensure that no phase separation occurs. In contrast, if unmodified rubber particles (or another hydrophobic compound) are added to a latex paint or other water-borne coating, the resulting coating will be unstable due to phase separation and an inherent incompatibility of its components. Unlike the coating according to this invention, such coatings will generally not withstand mechanical abrasion or chemical attack. In most instances, the presence of the added unmodified rubber particulate phase will interfere with the film formation process, and will result in the formation of cracks and deformities in the coating during the drying process.

In addition to waterborne coatings or paints, the amphiphilic modified rubber particles of this invention can be used in sport surfacing. A mix of amphiphilic modified rubber particles and a waterborne paint can be used in non-slippery tennis or basketball court surfacing by, for example, a pour-in-place installation techniques known to those skilled in the art. The elastic behavior of the included rubber particles can desirably provide cushioning safety features to such surfaces.

Modified rubber particles of this invention are also useful in other surface coatings. As discussed above, modification of rubber particles through the formation of hydrophobic PPIPNs enhances the internal structure of the rubber particles. One advantage of this approach is to add a thermoplastic behavior to the elastic rubber particles to render them suitable for further processing by melting and/or molding. Another advantage is the introduction of reactive functional groups to the rubber particles to enable their use as reactive agents in applications such as powder coatings.

Recently, efforts to lower air emissions in the coating industries have resulted in the substitution of dry powder coatings for liquid paints. The hydrophobic modified rubber particles of this invention are suitable for use in powder coating material formulations, such as those known and available to those skilled in the art. The hydrophobic modified rubber particles of this invention provide a cost-effective, environmentally safe means of protecting, for example, steel structures.

In another embodiment of this invention, modified rubber particles impregnated with a hydrophilic polymer are used as a soil substitute composition. Amphiphilic modified rubber particles of this invention can retain as much water as three times the dry particle weight. Water retention properties of the amphiphilic modified rubber particles allow for use in agricultural applications, particularly in remote locations with minimal water supplies. The water retention properties allow for more efficient use of available water. In addition, in the United States, fertilizer runoff significantly contributes to ground water pollution. Applying and using less water should reduce runoff, and less runoff potentially also reduces the amount of fertilizer needed.

The intermolecular water absorbing capability of hydrophilic modified rubber particles of this invention retain water and generally release it at a slow rate. A slow release of water can significantly reduce the amount of water needed to grow a plant, as well as reduce the number of time plants or crops need to be irrigated. In several experiments, seeds were planted in a mixture of soil and the modified rubber particles. The plants grew in the combination soil at a rate similar to a pure soil control. Also, when watering stopped, the plant in the control soil died in about 1.5 days while the plant in the combination soil lasted for about 4 days.

In one embodiment of this invention, in addition to absorbing, retaining and releasing water, the modified rubber particles that are added to or mixed with soil include an absorbed aqueous nutrient solution. The nutrient solution can be absorbed by the modified rubber particles before applying the modified rubber particles to the soil. In addition, the modified rubber particles, once added to the soil, will generally absorb nutrient solution, i.e., liquid fertilizer, added to the mixed soil. The modified rubber particles of this invention can be used for residential plants, and can provide a watering solution for plants left unattended for periods of time.

In one embodiment of this invention, the modified rubber particles are used with or in place of soil to grow natural grass in sport stadiums. In addition to providing an efficiently maintainable lawn, the modified rubber particles can desirably provide a softer nature to the sport surface, which in turns may prevent injuries. Using the modified rubber particles of this invention is likely more desirable than the alternative of simply spreading fine crumb rubber on an existing lawn, as is currently practiced. Applying crumb rubber may pose health concerns as the "free" rubber particles can be inhaled by the players, which may result in respiratory issues. The modified rubber particles of this invention are desirably integrally mixed with the soil and the grass roots, thus reducing or eliminating air-borne particles and reducing or eliminating health risks.

In another embodiment of this invention, the amphiphilic modified rubber particles are used in wastewater treatment applications, such as for stabilization and flocculation of foreign hydrophobic contaminants. The hydrophilic polymer phase provides a conduit for water to penetrate into the rubber particles and achieve contact with the hydrophobic rubber matrix, which desirably provides a domain for the absorption of the contaminants.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

Example 1

Materials

Waste rubber slabs with an approximate weight percent composition of 53.9% natural rubber (SMR-20), 26.9% carbon black (SRF), 10.8% aromatic oil and 8.4% curatives and additives were shredded using a lab-scale CUMBERLAND grinder, available from Cumberland Engineering Corporation, South Attleboro, Mass. The shredded rubber granulates of about 2-6 mm were pulverized into particles of different sizes using an SSSE pulverization process. A narrow size fraction of the pulverized rubber particles in the size range of 250 to 420 microns were collected using sieving. The collected particles were repeatedly washed with toluene to remove all dirt and soluble additives. An inhibitor-removing column, available from Sigma-Aldrich Co., was used to eliminate methyl ethyl hydroquinone (MEHQ) inhibitor from the acrylic acid monomer (99% AA inhibited with 200 ppm MEHQ). Azobisisobutyronitrile (98%, from Sigma-Aldrich) initiator was used as received without further purification. The water used in all experiments was double distilled using Barnstead distillation columns.

Preparation of Amphiphilic PPIPNs

Ten swelling mixtures containing 10-100 vol. % acrylic acid monomer in toluene were prepared as indicated in Table 1. All mixtures contained 0.3 mol % AIBN initiator on a solvent-free basis. 0.5 g of rubber particles were soaked in the prepared de-aerated swelling mixtures. The slurries were allowed to equilibrate over night at room temperature and then centrifuged at 1000 rpm for 5 minutes to remove excess monomer/solvent. The centrifuged swollen particles were transferred into test tubes (10 ml KIMAX glass test tube with screw cap) containing a 1 molar sodium chloride (NaCl) solution. The prepared samples were degassed several times and blanketed with nitrogen gas to insure the complete removal of oxygen from the test tubes prior to sealing with a cap. The test tube samples were placed in a water bath orbital shaker (Lab-line 3540, available from Barnstead International, Dubuque, Iowa) at an agitation speed of 200 rpm. The samples were kept in the shaker for 48 hours at 65° C. for micro-domain suspension polymerization of the acrylic acid. The polymerized samples were washed with water to remove the salt and any poly(acrylic acid) dissolved in the aqueous phase. The resulting particles were dried in a vacuum oven at 60° C. for 12 hours to ensure the complete removal of the remaining solvent (toluene) and water.

TABLE 1

| Sample | Volume ratio [AA]:[toluene] (ml) | Swelling coefficient |
| --- | --- | --- |
| Control | 0:10 | 2.75 |
| 1 | 1:9 | 2.68 |
| 2 | 2:8 | 2.54 |
| 3 | 3:7 | 2.37 |
| 4 | 4:6 | 1.96 |
| 5 | 5:5 | 1.58 |
| 6 | 6:4 | 1.23 |
| 7 | 7:3 | 1.04 |
| 8 | 8:2 | 0.79 |
| 9 | 9:1 | 0.70 |
| 10 | 10:0 | 0.54 |

Particle Size Distribution (PSD) Measurements

A laser diffraction technique was used to measure the equivalent volume size distribution of the particulate materials using a Coulter LS 230 device, available from Beckman Coulter, Inc., Fullerton, Calif. In this method, the suspended particles in a circulating fluid pass through a laser beam cell for size detection. Because the rubber particles are partially cross-linked, they do not dissolve in any solvent, but they swell and disperse well in a good solvent like toluene. However, if toluene is used as the dispersing medium, the PSD measurement has to be corrected to obtain the size of unswollen particles. Assuming a spherical shape for the particles, this correction could be expressed by:

$$r_1 = r_2 \phi_2^{1/3}$$

where $\phi_2$ is the volume fraction of the rubber; and $r_2$ and $r_1$ are the radii of the swollen and unswollen particles, respectively.

The PSD of the sieve-collected rubber particles in the range of 250-420 microns was measured in toluene using a laser diffraction particle size analyzer. As indicated in FIG. 1 and Table 2, the particle size measurement shows both smaller and larger particles than the ones measured using the sieves (250-420 microns). Smaller sizes were due to deagglomeration of the particles in toluene, which resulted from penetration of toluene in the voids between the primary particles. Larger sizes were due to the swelling of the individual particles. The volume fraction of rubber in the swollen particles was estimated as 0.29 using Equation 1. Each size fraction of the swollen particles was corrected by this factor to obtain the size distribution of unswollen particles. As indicated in Table 2, more than 50% of the unswollen particles were smaller than the lower size limit (250 microns) of particle size measured using sieves. This seems to indicate that the particles produced using the SSSE pulverization process contained a large amount of agglomerates.

TABLE 2

| Sample | Mode (microns) | Median (microns) | Size range (microns) |
| --- | --- | --- | --- |
| Swollen particles | 356 | 349 | 2-994 |
| Unswollen particles | 231 | 226 | 1-708 |
| Sample IP | 245 | 250 | 1-993 |

Figure 2:
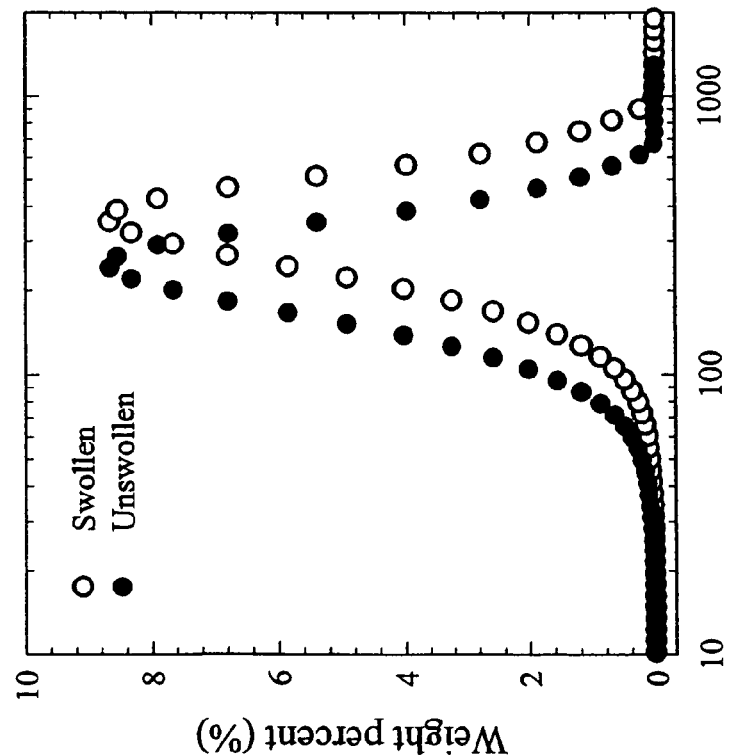
FIG. 2 is a plot summarizing the size distribution of Sample 5 dispersed in water.

To determine the water dispersibility of the prepared PPIPNs and compare it with the unmodified rubber particles, the PSD of the samples was measured using water as the dispersing medium. The unmodified rubber particles formed agglomerates larger than the maximum size range of the instrument (2000 microns) confirming their poor dispersibility in water. However, the produced PPIPNs were water dispersible and their PSD could be analyzed in this medium. The PSD of the Sample 5 in water is shown in FIG. 2, and appears to be similar to the distribution of unmodified rubber particles in toluene. This could because the produced PPIPNs disperse better in water due to the formation of hydrophilic poly (acrylic acid) on the surface of the hydrophobic rubber particles. However, a small amount of agglomerated PPIPNs is observed on the right shoulder of the PSD, between 700-1000 microns. These could be an indication that a small portion of the very fine particles in the initial sample does not end-up as PPIPNs. These particles would naturally agglomerate in water and show up as the large size peak in FIG. 2.

Swelling Coefficient Measurement

Approximately 0.5 g of the rubber particles were immersed in separate test tubes containing each of the swelling mixtures shown in Table 1. The samples were allowed to equilibrate at room temperature for a period of 24 hours. The swollen particles were centrifuged at a speed of 1000 rpm for 5 minutes to remove the excess solvent and then immediately weighed. The equilibrium-swelling coefficient was calculated as:

$$\text{Swelling coefficient} = \left[\frac{W_2 - W_1}{W_1}\right]$$

where $W_1$ and $W_2$ are the weights of dry and swollen rubber particles, respectively.

Figure 3:
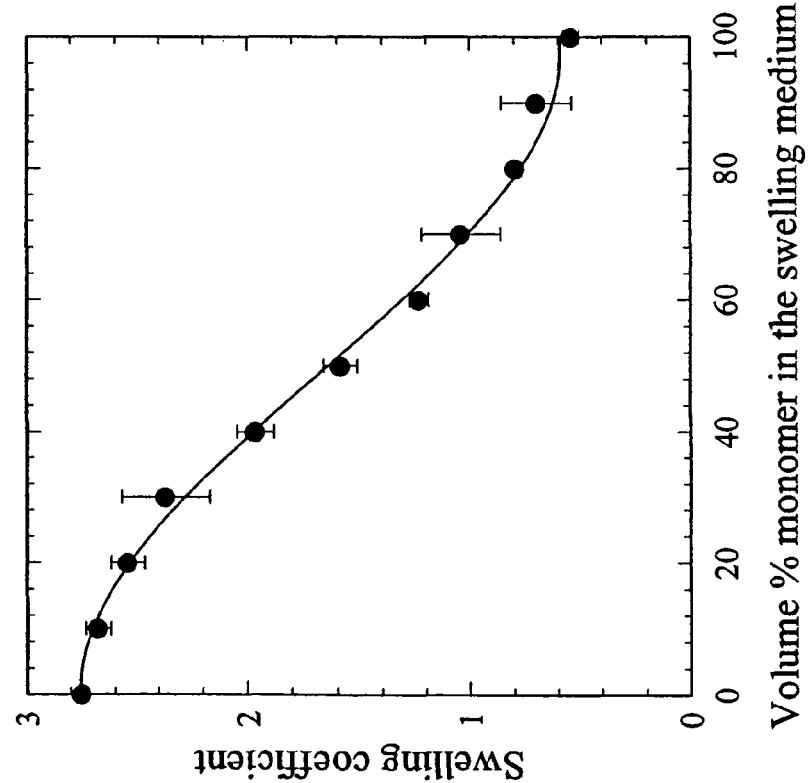
FIG. 3 is a plot summarizing the swelling degree of rubber particles based on the volume fraction of acrylic acid monomer in the initially prepared reaction mixtures of Example 1.

The swelling coefficient of each sample was calculated using the above equation and is reported in Table 1. The use of toluene in the reaction mixture was necessary despite the closeness of the solubility parameter of rubber, 19.8 $MPa^{1/2}$, and acrylic acid monomer, 24.6 $MPa^{1/2}$. As shown in FIG. 3, the swelling degree of the rubber particles decreases by increasing the volume fraction of acrylic acid in the reaction mixture. Addition of toluene resulted in swelling of the rubber networks and enhancement in absorption of acrylic acid.

The concentration of monomer absorbed by the rubber particles was inferred from gas chromatography (GC) measurements on the remaining swelling mixtures using a 6890 Spectrometer, available from Hewlett-Packard, Palo-Alto, Calif. The concentration of acrylic acid in the swelling medium was measured after swelling equilibrium state was reached and then subtracted from the concentration of acrylic acid in the initially prepared swelling mixture to calculate the amount of monomer absorbed by the rubber particles.

The kinetics of the polymerization reaction was estimated by taking out a sample in intervals of two hours and transferring it to an aluminum pan containing methanol and hydroquinone to stop the reaction. The fractional monomer conversion "$X_m$" was calculated using gravimetric analysis:

$$X_m = \frac{p \times W_{IPN}}{M_0}$$

where $M_0$ is the weight of monomer absorbed by the rubber particles; $W_{IPN}$ is the weight of dried PPIPN samples; and p is the weight fraction of poly(acrylic acid) in the composite particles.

Figure 4:
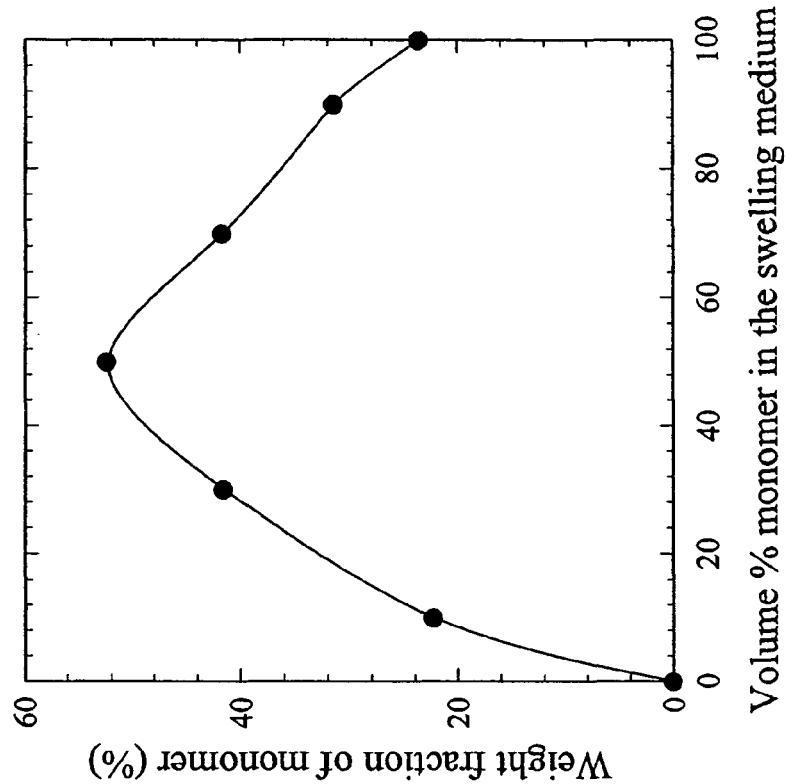
FIG. 4 is a plot summarizing the weight fraction of the acrylic acid monomer absorbed by the swollen rubber particles after reaching the equilibrium swelling state.

The maximum monomer absorption was achieved in the case of reaction mixture initially containing 50 vol. % monomer, as indicated in FIG. 4. The likely reason is that the reaction mixture was concentrated enough and the rubber particles were sufficiently swollen with toluene. Addition of monomer in the reaction mixtures containing less than 50 vol. % acrylic acid resulted in more absorption of the acrylic acid due to extended swelling of the rubber particles in these samples. Further addition of acrylic acid to more than 50 vol. % resulted in less absorption of monomer by the rubber particles. This is because of the limited amount of toluene in these reaction mixtures and consequently, low swelling degree of the rubber particles.

Desorption of Monomer into the Aqueous Phase

The polymerization reaction of acrylic was intended to take place within the hydrophobic phase (rubber particles) using an oil-soluble initiator (AIBN) and assuming that the acrylic acid monomer remains in the particles. However, the ionization of acrylic acid at the interface with water results in desorption of acrylic acid into the aqueous phase of the system. By increasing the ionic strength of the aqueous phase and lowering the solubility of acrylic acid in the aqueous phase, desorption of monomer was controlled during the polymerization reaction. However, the polymerization reaction most likely occurred in the shell region of the particles and some desorbed in to the aqueous phase. At low ionic strength (e.g., 0.1 M NaCl), the poly(acrylic acid) yield in the resulting particles was almost negligible in all samples, indicating excessive monomer desorption. This was also confirmed by pH measurement of the aqueous phase. The ionic strength was increased to 1 M NaCl electrolyte and subsequently desorption of the acrylic acid was lowered substantially.

Kinetics of Polymerization and Composition of the Prepared PPIPNs

Figure 5:
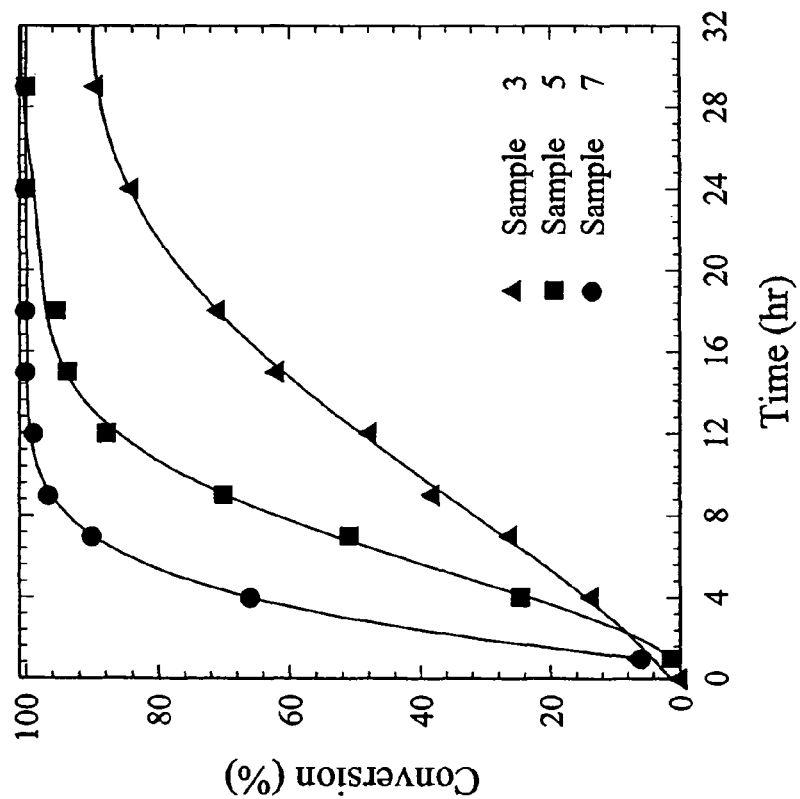
FIG. 5 is a plot summarizing the fractional monomer conversion obtained experimentally for Samples 3, 5 and 7.

The overall conversion of monomer was calculated and found to exceed 80% in all samples. FIG. 5 illustrates the kinetics of polymerization of acrylic acid in the selected Samples 3, 5 and 7. The rate of polymerization reaction obtained experimentally was much lower than theoretically expected. Most likely, this resulted from a non-uniform distribution of acrylic acid in the particles, as the hydrophilic monomer tends to migrate toward the aqueous interface. Thus, most of the polymerization reaction occurs in the shell region of the particles, where the available concentration of oil soluble initiator, AIBN, was lower than the total absorbed by the particles. In particular, due to a low concentration of the initiator in Sample 3, the rate of polymerization was lower than for Samples 5 and 7 (see FIG. 5). As a result, the viscosity of the polymerization loci within the swollen particles increased faster in the case of Samples 5 and 7. It is expected that the poly(acrylic acid) chains interpenetrated their molecular interstices within the rubber network in Samples 5 and 7 more than Sample 3. The study on the morphology of the produced particles was followed by the thermal degradation analysis of the samples.

Figure 6:
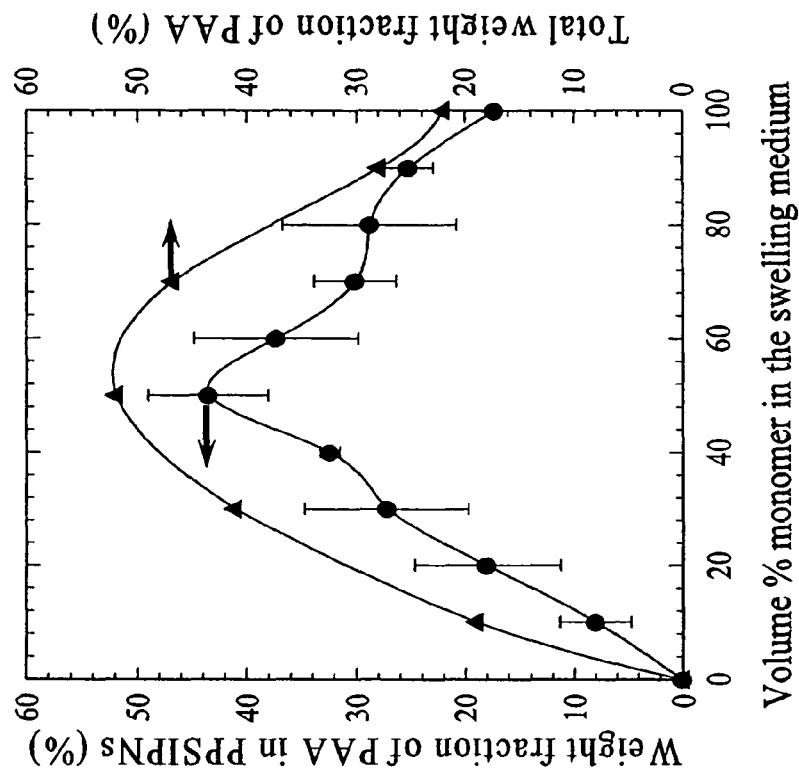
FIG. 6 is a plot summarizing the composition of the poly (acrylic acid) yield in the rubber particles, with the total poly(acrylic acid) including poly(acrylic acid) formed in the rubber particles and dissolved in aqueous phase of the reaction.

FIG. 6 indicates the composition of prepared PPIPN as a function of monomer volume fraction in the initially prepared swelling reaction mixture. The maximum poly(acrylic acid) yield was achieved in the case of Sample 5 that also absorbed the highest amount of monomer in the swelling step (see FIG. 4). FIG. 6 shows that there was a considerable difference between the total amount of poly(acrylic acid) obtained in the test tube samples and the interpenetrated poly(acrylic acid) in the rubber particles. During the polymerization of acrylic acid, phase segregation occurs due to difference in hydrophilicity of poly(acrylic acid) and rubber. Thus a large portion of poly(acrylic acid) was desorbed into the aqueous phase.

Thermal Characterization

The thermal degradation behavior of the prepared samples was studied using a thermal analyzer, Model STA 625, available form Polymer Laboratories, Amherst, Mass. Experiments were conducted in the temperature range of 35-550° C.

under a nitrogen gas purge at scanning rate of 10° C./min. Samples were prepared in open pans containing about 10 mg of the composite particles.

Figure 7:
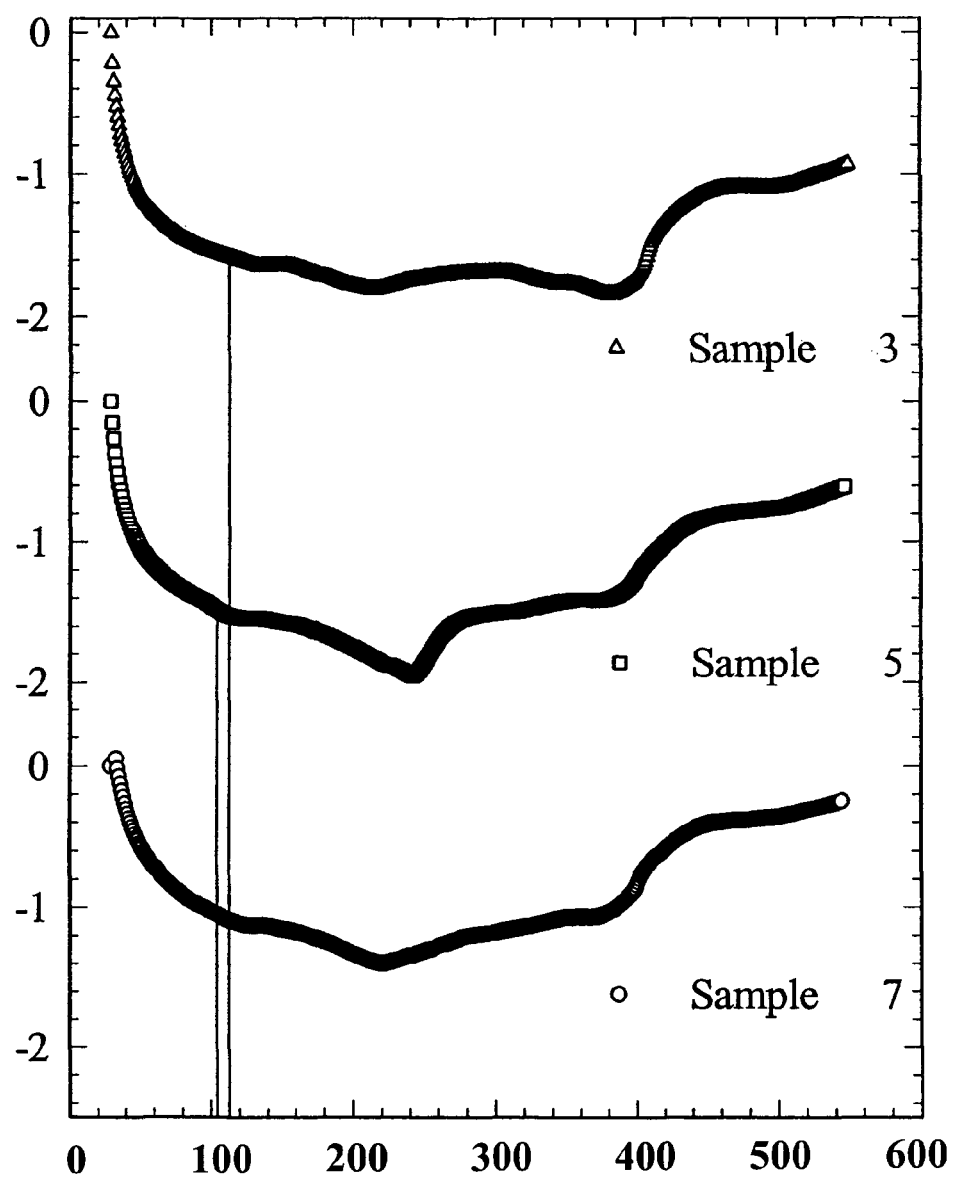
FIG. 7 is a plot summarizing the differential scanning calorimetry results for unmodified rubber particles compared to Samples 3, 5 and 7. The lines show the $T_g$ of the poly (acrylic acid) phase in the composite particles.

FIG. 7 illustrates the thermal behavior of prepared PPIPN samples as measured by differential scanning calorimetry (DSC). The DSC traces showed two endothermic peaks; one peak in the range of 150-280° C., due to thermal degradation of poly(acrylic acid), and the second peak in the range of 340-450° C., which reflects the thermal degradation of rubber. The glass transition ($T_g$) temperature of both rubber and poly(acrylic acid) were individually measured as −60° C. and 110° C., respectively. In a multi-phase component polymeric system, the $T_g$ value of composite materials indicates the degree of miscibility. Partial miscibility of the components results in a shift in $T_g$ of each component toward the other and a single $T_g$ value could be obtained when the components are completely miscible. The $T_g$ value of poly(acrylic acid) in the prepared PPIPNs was measured from DSC results summarized in Table 3. The $T_g$ values of poly(acrylic acid) in the case of Samples 5 and 7 slightly shifted toward the $T_g$ value of rubber (−60° C.), which indicates a partial interpenetration of poly(acrylic acid) chains in the rubber network. To ensure the reproducibility of the results, these measurements were repeated several times and followed by thermo-gravimetric analysis (TGA) of the samples.

TABLE 3

| Sample | $T_{g1}$ (° C.) | $DTG_{p1}$ (wt. %/° C.) | $DTG_{p2}$ (wt. %/° C.) |
|---|---|---|---|
| 3 | 110 | −0.06 | −0.8 |
| 5 | 105 | −0.24 | −0.64 |
| 7 | 105 | −0.16 | −0.68 |

(1 corresponds to PAA phase and 2 relates to rubber phase)

Figure 8:
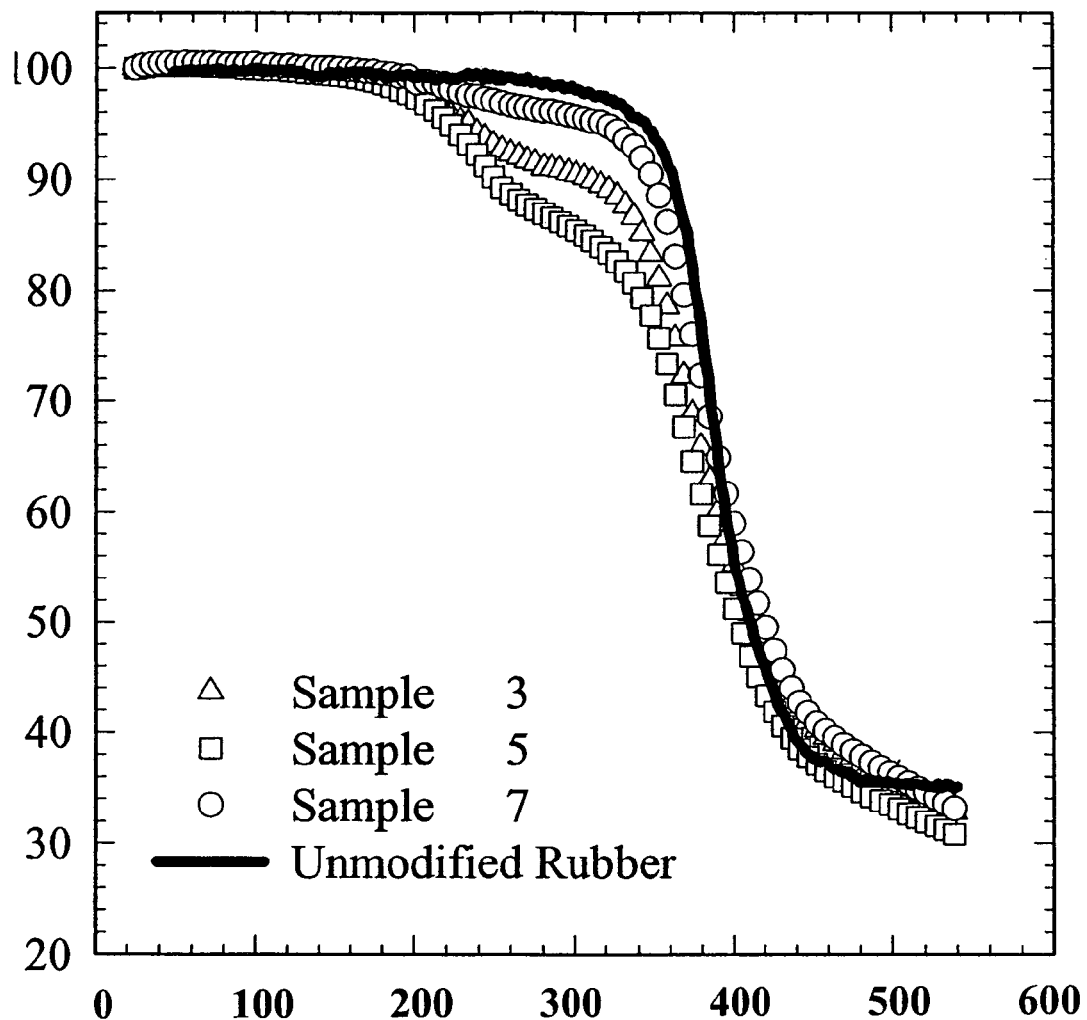
FIG. 8 is a plot summarizing the weight loss change of unmodified rubber particles compared to Samples 3, 5 and 7 due to thermal degradation under the purge of nitrogen gas.

The weight loss of samples due to thermal degradation was obtained from the TGA results shown in FIG. 8. These results provide helpful information regarding the composition and phase structure of the samples. The TGA traces of samples in FIG. 8 show that two major weight loss events are observed in two distinct regions. The first weight loss was due to degradation of poly(acrylic acid) (at about 200-340° C.) and the second weight loss was due to degradation of rubber (at about 340-460° C.). Carbon black and some other additives remain in the form of residues at the temperatures above 500° C. Due to differences between the poly(acrylic acid) content of the samples, the amount of residues at the end of experiments also differs. Therefore, the residual content can be used to indicate the composition of prepared PPIPNs, knowing the amount of residues in the unmodified rubber particles is approximately 35 wt. % (see FIG. 8).

As indicated in FIG. 8, the amount of residues was the same in the case of Samples 3 and 7, which means they contain the same amount of poly(acrylic acid), as was also confirmed by the weight change measurement results shown in FIG. 6. However, different weight loss behavior due to degradation of poly(acrylic acid) was observed in the temperature range of 200-340° C. This could be because in Sample 7, some parts of the poly(acrylic acid) chains were deeply interpenetrated and trapped in the rubber network. Thus, the weight loss of this portion of poly(acrylic acid) chains was observed during the degradation of rubber network in the temperature range of 340-460° C.

Figure 9:
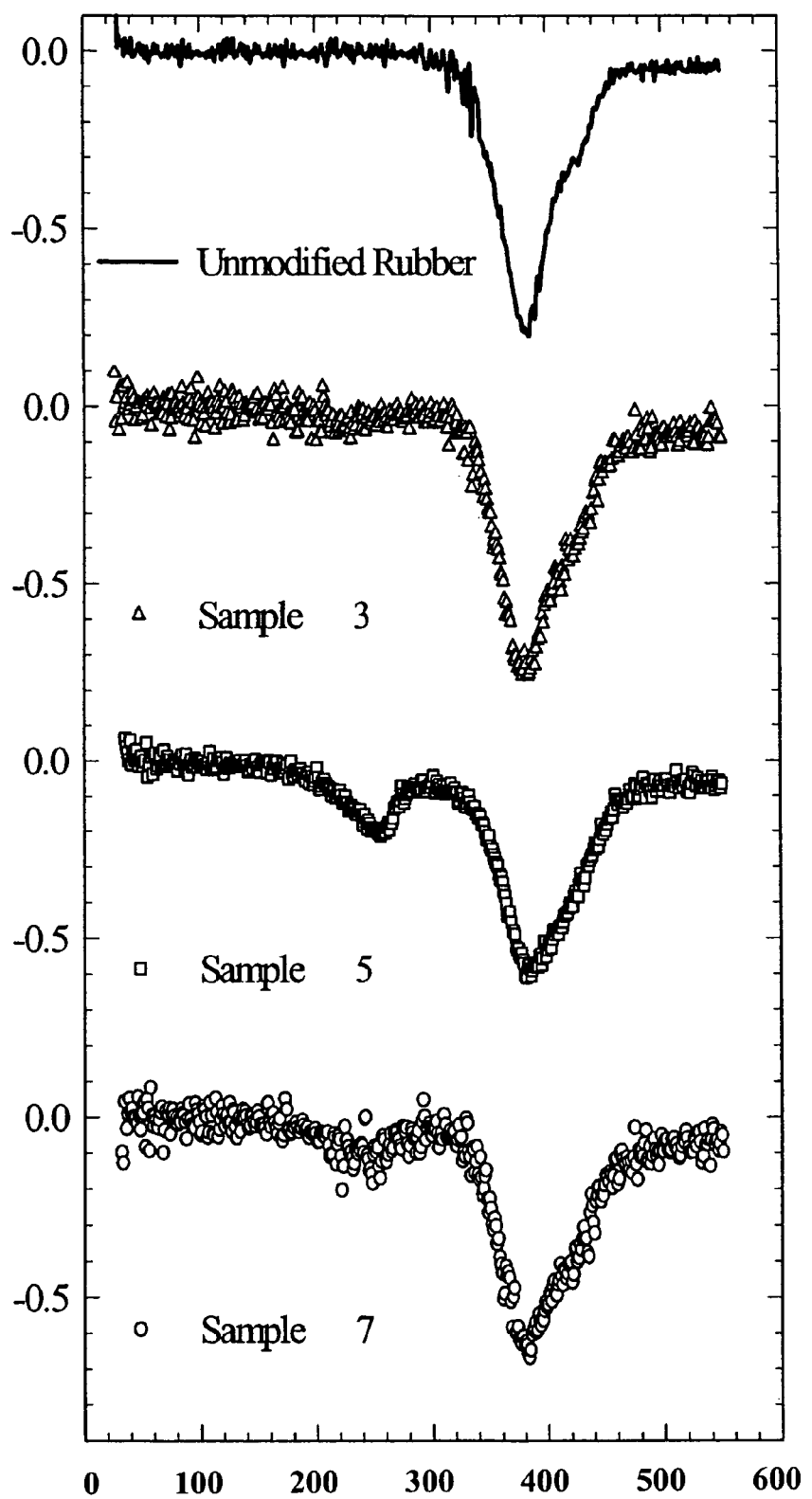
FIG. 9 shows the differential thermo-gravimetric analysis of the unmodified rubber particles compared to Samples 3, 5 and 7.

Table 3 indicates the extent of degradation of sample components extracted from FIG. 9. The extent of degradation of unmodified rubber particles was measured as −0.8 wt. %/° C. In the case of Sample 3, the extent of degradation of rubber chains ($DTG_{p2}$) was similar to unmodified rubber sample. However, the $DTG_{p2}$ value in the case of Samples 5 and 7 was smaller than the unmodified rubber sample. These results indicated that more penetration of poly(acrylic acid) within the rubber networks occurred in Samples 5 and 7, thus improving the thermal degradation behavior of the rubber phase in these samples, as shown in FIG. 9. As indicated in FIG. 9, the degradation peak of the rubber phase in Samples 5 and 7 shifted toward higher temperatures compared to thermal degradation behavior of Samples 3 and unmodified rubber.

Thus, amphiphilic composite particles were successfully prepared on a matrix of recycled rubber material. Polymerization of monomer absorbed by the rubber particles resulted in partial interpenetration of poly(acrylic acid) in the intermolecular structure of rubber networks. To increase the hydrophilicity of the rubber particles, the absorption of acrylic acid by the particles was enhanced by addition of toluene as a swelling agent. However, addition of toluene could result in less interpenetration of poly(acrylic acid) in the rubber network. Therefore, by adjusting the amount of the solvent in the reaction mixture, the composition of the PPIPNs was better controlled. The resulting composite particles were water dispersible and suitable for use in aqueous media applications.

Example 2

Materials

An inhibitor-removing column (available from Sigma-Aldrich) was used to eliminate methyl ethyl hydroquinone (MEHQ) inhibitor from an acrylic acid (AA) monomer (99% AA inhibited with 200 ppm MEHQ). Azobisisobutyronitrile (98%, from Aldrich) initiator was used as received without further purification. A commercially available waterborne air curing styrene-acrylic emulsion was obtained from Johnson Polymer, Racine, Wis. The emulsion's formula was modified by addition of organic solvents in order to form a film at room temperature. The organic solvents included 1-phenoxy-2-propanol (DOWANOL-PPh, Sigma-Aldrich), di(propylene glycol)methyl ether (DPM, Sigma-Aldrich) and di(propylene glycol)butyl ether (DOWANOL-DPnB, Sigma-Aldrich). Unpolished steel panels (10 mm; 20 mm; 0.63 mm) were surface modified according to the procedure explained in ASTM D 609-95.

Waste rubber slabs with approximate weight percent composition of 53.9% SMR-20 (natural rubber), 26.9% SRF (carbon black), 10.8% aromatic oil and 8.4% curatives and additives were granulated using a lab-scale grinder. These rubber granulates were pulverized into particles of different sizes using two similar SSSE pulverization processes. Particle size measurements were conducted according to ASTM D 5644 and ASTM D 5603.

Preparation of Amphiphilic PPIPNs

Swelling mixtures containing 30, 50 and 70 volume percent acrylic acid in toluene were prepared. Toluene was added to the reaction mixtures to make the rubber particles more receptive to the acrylic acid. All mixtures contained 0.3 mol % AIBN initiator on a solvent-free basis. About 150 g of the rubber particles having a size range of 250 microns to 425 microns were sieve collected and soaked in the prepared de-aerated swelling mixtures. The slurries were allowed to equilibrate over night at room temperature and then centrifuged to remove excess monomer/solvent. The swollen particles were centrifuged and transferred into a 1000 ml CSTR reactor containing an electrolyte solution and having a 200 rpm stirring speed. The electrolyte solution was used to make the acrylic acid exclusive of the aqueous phase. The reactants were kept in the reactor for 24 hours at 75° C. for microdomain suspension polymerization of the acrylic acid under the purge of nitrogen gas. The polymerized samples were washed with water to remove the salt and any poly(acrylic acid) (PAA) dissolved in the aqueous phase. Then the resulting powder samples were dried in a vacuum oven at 60° C. for 12 hours to ensure the complete removal of the remaining solvent and water. Table 4 summarizes the samples made from the three swelling mixtures.

TABLE 4

| Sample | Rubber content (wt. %) | PAA content (wt. %) |
|---|---|---|
| 11 | 70 | 30 |
| 12 | 50 | 50 |
| 13 | 70 | 30 |

Low-VOC Coatings Preparation

The poly(acrylic acid) in the prepared modified rubber particles absorbs a considerable amount of water. Addition of these particles into an emulsion results in absorbing the water in the emulsion and forming a thick paste. Therefore, the prepared modified rubber particles were kept in water long enough to reach the equilibrium state before adding them to the emulsion. For room temperature film formation of the prepared suspensions of particles/emulsion, addition of some organic solvent was necessary. However, in all prepared mixtures, the amount of solvent added to the emulsion was kept below the maximum limit of 240 g/l VOC. A flash rust inhibitor was sufficiently added to the waterborne emulsion to lower the degree of rusting to less than 0.01% of the surface (rust grade 10) according to ASTM D 610-95. Based on the dry weight of the coating prepared, modified rubber particles in different amounts were added to the emulsion to obtain 30 wt. %, 40 wt. % and 50 wt. % of modified rubber particles in the dried coating samples. Uniform thickness coatings were prepared according to ASTM D 823-95 practice E (hand-held blade film application). Addition of Sample 11 particles to the emulsion to form a film required additional organic solvent, which exceeds the maximum VOC limit content. This was due to the high concentration of PAA on the surface of modified rubber particles. Therefore, Sample 11 was not used in the experimental set up. In the case of Sample 12 and 13, the maximum amount of modified rubber particles to form a uniform film without exceeding the maximum limit of VOC content was about 50 wt. % and 40 wt. %, respectively. Table 5 summarizes the specifications of the prepared coating samples.

TABLE 5

| Sample | Particle wt. % in the dry coating | Thickness$^a$ (mils) | Gloss 20° C. | 85° C. | 60° C. |
|---|---|---|---|---|---|
| Control | 0 | 5.1 | 74.5 | 87.6 | 86.2 |
| Sample 12-30 | 30 | 22 | 7.2 | 41.4 | 46.7 |
| Sample 12-40 | 40 | 19.8 | 1.7 | 14.9 | 16.7 |
| Sample 12-50 | 50 | 20.2 | 0.5 | 5.3 | 3.8 |
| Sample 13-30 | 30 | 19.9 | 1.8 | 16 | 20.8 |
| Sample 13-40 | 40 | 24.4 | 0.2 | 3.4 | 1.9 |

$^a$According to ASTM D 1005-95

Impact Strength

Figure 10:
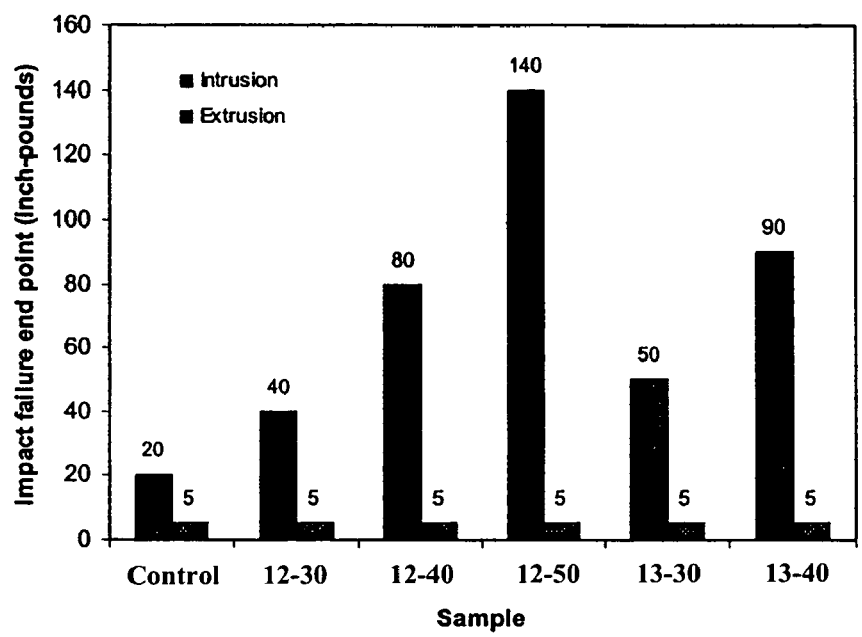
FIG. 10 summarizes the resistance of the prepared example surface coatings to the effects of rapid deformation, both intrusion and extrusion.

The coatings on the steel panels were subjected to rapid deformation by a falling weight to determine their damping impact, according to ASTM D 2794-93. Two methods for measuring the impact strength were used: intrusion and extrusion. In the intrusion test, the falling weight hits the sample on the coating surface and, the in the extrusion test, the falling weight hits the sample from the backside of the coating samples. FIG. 10 summarizes the resistance of the prepared coatings to the effects of rapid deformation, intrusion and extrusion.

As shown in FIG. 10, the emulsion prepared control coating had weak intrusion and extrusion impact strength. Addition of the modified rubber particles to the emulsion significantly improved the intrusion impact strength of the prepared coatings. The impact strength was improved more by addition of Sample 13 compared to Sample 12 with the same weight % of modified rubber particles (Sample 12-40 vs. Sample 13-40). The reason is likely that the rubber content of Sample 13 was higher than Sample 12, as shown in Table 4. No significant change was observed in the extrusion impact strength of the samples by addition of modified rubber particles. This might be due to the low adhesion strength of the emulsion itself to the substrate surface, as will be explained below.

Adhesion Rate

If a coating is to fulfill its function of protecting the substrate, it must adhere to the surface of the substrate. Tape test methods A and B (ASTM D 3359-97) were conducted on the samples. The tape used in this measurement was manufactured by 3M (core series 2-3610). In this test method, the adhesion of the coatings to the substrate could be rated by the adhesion strength of the tape to the coatings. If the tape adheres to the coating surface stronger than the coating to the substrate, it can peel off the coating from the substrate. This test method measures the adhering rate of the coating ranging from 0 (indicating minimum adhesion) to 5 (indicating maximum adhesion). Test method A is for thick coatings and method B is for thin coatings. The results are summarized in Table 6.

TABLE 6

| Sample | Adhesion classification |
|---|---|
| Control | 0B |
| Sample 12-30 | 5A |
| Sample 12-40 | 5A |
| Sample 12-50 | 5A |
| Sample 13-30 | 5A |
| Sample 13-40 | 5A |

The results indicate that the control emulsion had poor adhesion to the steel panels. The adhesion of the surface coatings increased upon the addition of the modified rubber particles to the emulsion. Without wishing to be limited by theory, this could be due to the acid groups of poly(acrylic acid) on the surface of the modified rubber particles, which create strong adhering bonds with the steel surface, resulting in a better adhesion of the coatings to the substrate.

Abrasion Resistance

Coatings on substrates can be damaged by abrasion. The Taber abrasion test is a useful method in evaluating the abrasion resistance of the coatings (ASTM D 4060). In this test, the coated rotating panel under weighted abrasive wheels abrades the coating. The calibrase abrasive wheel type CS-10, available from Taber Industries, was used under a 1 kg load. The weight loss of the coating due to abrasion was recorded for each sample during 1000 wear cycles. Table 7 summarizes the results.

TABLE 7

| Sample | Weight loss after 250 cycles (mg) | Weight loss after 500 cycles (mg) | Weight loss after 750 cycles (mg) | Weight loss after 1000 cycles (mg) | Wear index |
|---|---|---|---|---|---|
| Control | 37.7 | 77.6 | 114.9 | 149.6 | 149 |
| Sample 12-30 | 45.7 | 87.5 | 131.2 | 171.3 | 165 |
| Sample 12-40 | 44.2 | 90.7 | 132.8 | 181.1 | 183 |
| Sample 12-50 | 58.6 | 121.9 | 191.6 | 271.3 | 284 |
| Sample 13-30 | 44.3 | 86.5 | 126.8 | 169.6 | 167 |
| Sample 13-40 | 66.7 | 147.8 | 228.2 | 319.1 | 336 |

The weight loss measurement of the samples in the first 250 cycles is often less accurate compared to the other cycle measurements because the results might have been affected by the uneven surface. The wear index of the coatings was measured using the following equation and the results obtained from 250 to 1000 wearing cycles:

$$WearIndex = \frac{(A-B) \times 1000}{C}$$

where A is the weight of test specimen before abrasion (mg); B is the weight of test specimen after abrasion (mg); and C is the number of cycles of abrasion recorded.

The Wear index indicates the abrasion resistance of the coatings. As shown in Table 7, the control sample had the highest abrasion resistance compared to the other samples. The likely reason is that the modified rubber particles are generally much softer than the emulsion used, and they abrade faster. However, Samples 12-30 and 13-30 had almost the same resistance as the control. Thus, controlling the amount of modified rubber particles added to the coatings can provide a suitable abrasion resistance.

Hardness

Figure 11:
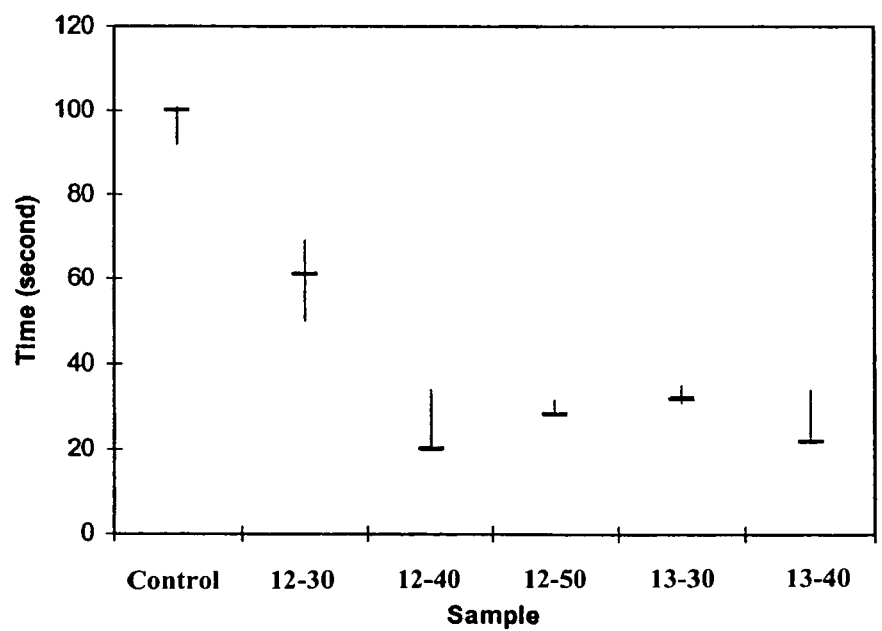
FIG. 11 summarizes the hardness of the prepared example surface coatings.

Depending on the elastic behavior of the coatings, different resistance to deformation can be obtained. The Konig pendulum hardness test was conducted on the prepared coatings based upon ASTM D 4366-95. This test method embodies the principle that the amplitude of oscillation of a pendulum touching the surface of a coating decreases more rapidly if the surface is softer. FIG. 11 summarizes the hardness of the prepared surface coatings by this test method. As shown in FIG. 11, the hardness of the prepared surface coatings decreases by addition of more than 40 wt. % modified rubber particles.

The results demonstrate the advantages of adding the modified rubber particles of this invention to waterborne surface coatings. Mechanical properties such as impact strength were improved by addition of these composite particles. The hardness of the prepared coatings reduced significantly in the prepared coatings, which makes them suitable for sport surface applications. The hydrophilic character of the modified rubber particles enables preparing coatings with any color.

Thus, the invention provides a method for modifying rubber particles, particularly recycled rubber, such as from used tires. The improved properties of the modified rubber particles of this invention allow for the used of the recycled rubber in numerous new ways, such as in surface coatings or as a soil substitute. It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method of forming a composition including rubber particles, the method comprising:
   providing a quantity of the rubber particles;
   impregnating an interstitial molecular space with a hydrophobic polymerizable monomer; and
   reacting the hydrophobic polymerizable monomer to form a hydrophilic polymer impregnating the interstitial molecular space of the rubber particles.

2. The method according to claim 1, wherein the rubber particles comprise pulverized tire rubber having an average particle diameter of about 75 microns to about 1000 microns.

3. The method according to claim 1, further comprising increasing the interstitial molecular space in the rubber particles with a hydrophobic swelling agent.

4. The method according to claim 3, wherein the swelling agent comprises toluene.

5. The method according to claim 1, further comprising impregnating the interstitial molecular space with a hydrophilic polymerizable monomer and reacting the hydrophobic polymerizable monomer with the hydrophilic polymerizable monomer to form the hydrophilic polymer.

6. The method according to claim 5, wherein the hydrophilic polymerizable monomer comprises acrylic acid or methacrylic acid.

7. The method according to claim 1, wherein the hydrophobic polymerizable monomer comprises styrene, methyl methacrylate, butyl acrylate, glycidil methacrylate, hydroxy ethyl methacrylate, or combinations thereof.

8. The method according to claim 1, wherein the reacting the hydrophobic polymerizable monomer to form the hydrophilic polymer comprises:
   polymerizing the hydrophobic polymerizable monomer to impregnate the rubber particles with a hydrophobic polymer; and
   converting the hydrophobic polymer to the hydrophilic polymer impregnating the interstitial molecular space of the rubber particles.

9. The method according to claim 8, wherein the hydrophobic polymerizable monomer comprises vinyl acetate and the hydrophobic polymer comprises poly(vinyl acetate), and further comprising:
   converting the poly(vinyl acetate) to hydrophilic polyvinyl alcohol.

10. The method according to claim 1, wherein the composition comprises a waterborne paint, and the method additionally comprises adding the modified rubber particles to a waterborne paint formulation.

11. The method according to claim 1, wherein the composition comprises a soil substitute.

12. The method according to claim 11, additionally comprising absorbing an aqueous nutrient solution with the modified rubber particles.

13. The method according to claim 11, further comprising mixing the modified rubber particles with soil.

14. The method according to claim 11, wherein the soil substitute is a sport surface additive for mixing with soil for a sport field.

15. A method of forming a composition including rubber particles, the method comprising:
providing a quantity of the rubber particles;
impregnating the rubber particles with a first polymerizable monomer comprising a hydrophobic monomer;
impregnating the rubber particles with a second polymerizable monomer comprising a hydrophilic monomer; and
polymerizing the first polymerizable monomer with the second polymerizable monomer to impregnate the rubber particles with a hydrophilic polymer to form modified rubber particles.

16. The method according to claim 15, wherein the hydrophobic monomer comprises styrene.

17. The method according to claim 15, wherein the second polymerizable monomer comprises acrylic acid or methacrylic acid.

18. The method according to claim 15, additionally comprising increasing an interstitial molecular space in the rubber particles with a swelling agent.

19. The method according to claim 15, wherein the composition comprises a waterborne paint, and the method additionally comprises adding the modified rubber particles to a waterborne paint formulation.

20. The method according to claim 1, wherein the composition comprises a soil substitute.

* * * * *